M. FOGDE.
GEAR CUTTING ATTACHMENT FOR MILLING MACHINES.
APPLICATION FILED JAN. 9, 1920.
1,377,330.
Patented May 10, 1921.
4 SHEETS—SHEET 2.
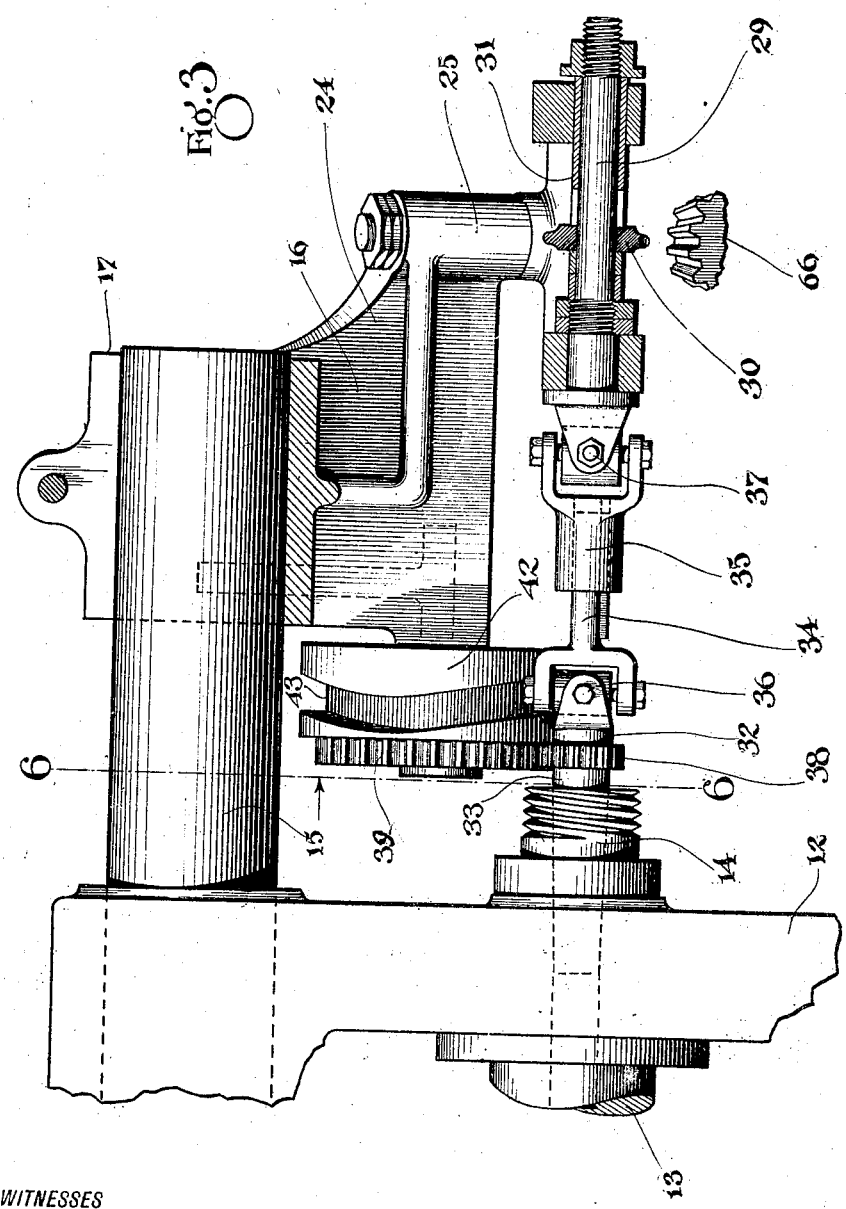
WITNESSES
INVENTOR
M. Fogde
BY
ATTORNEYS

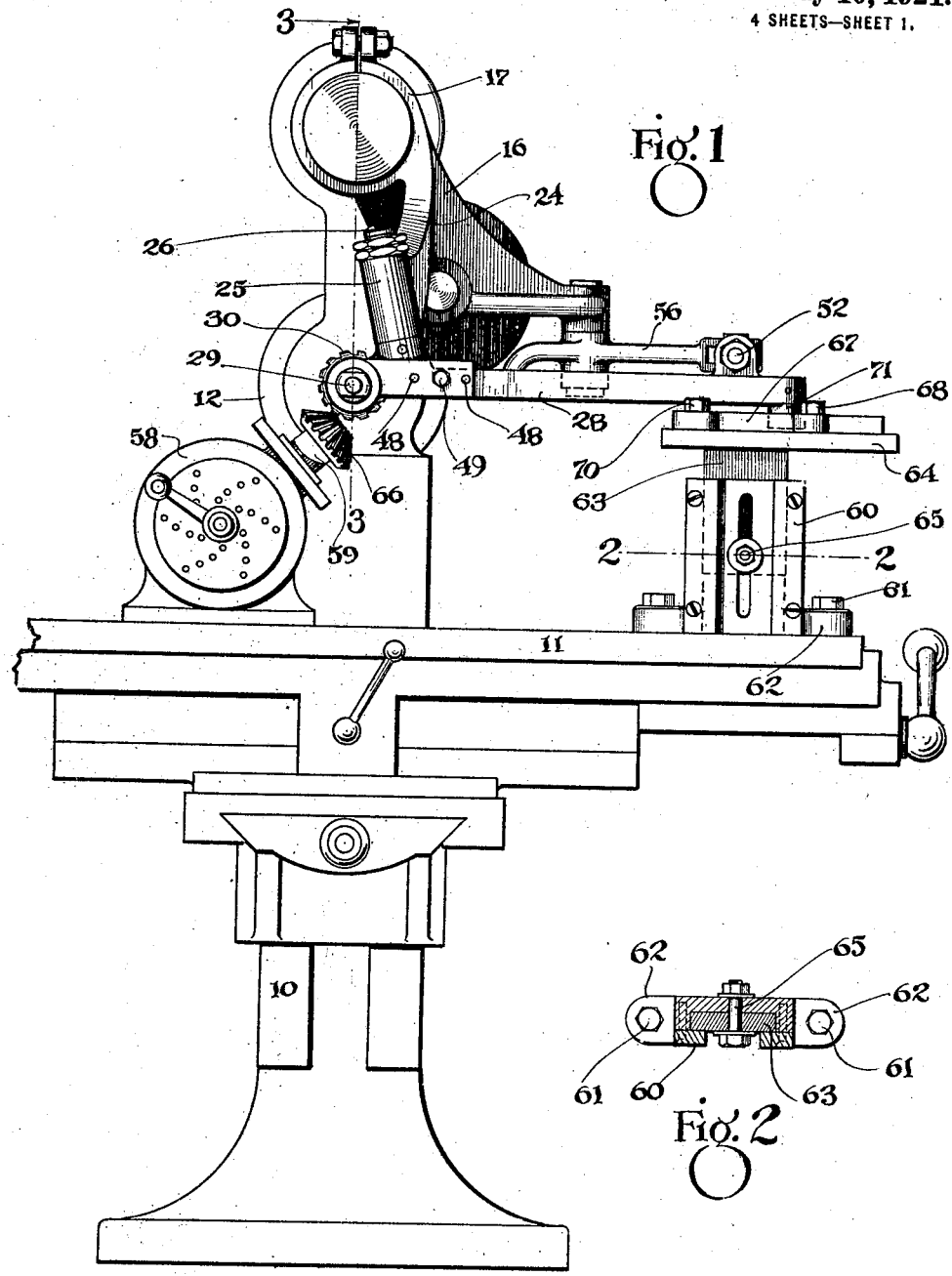

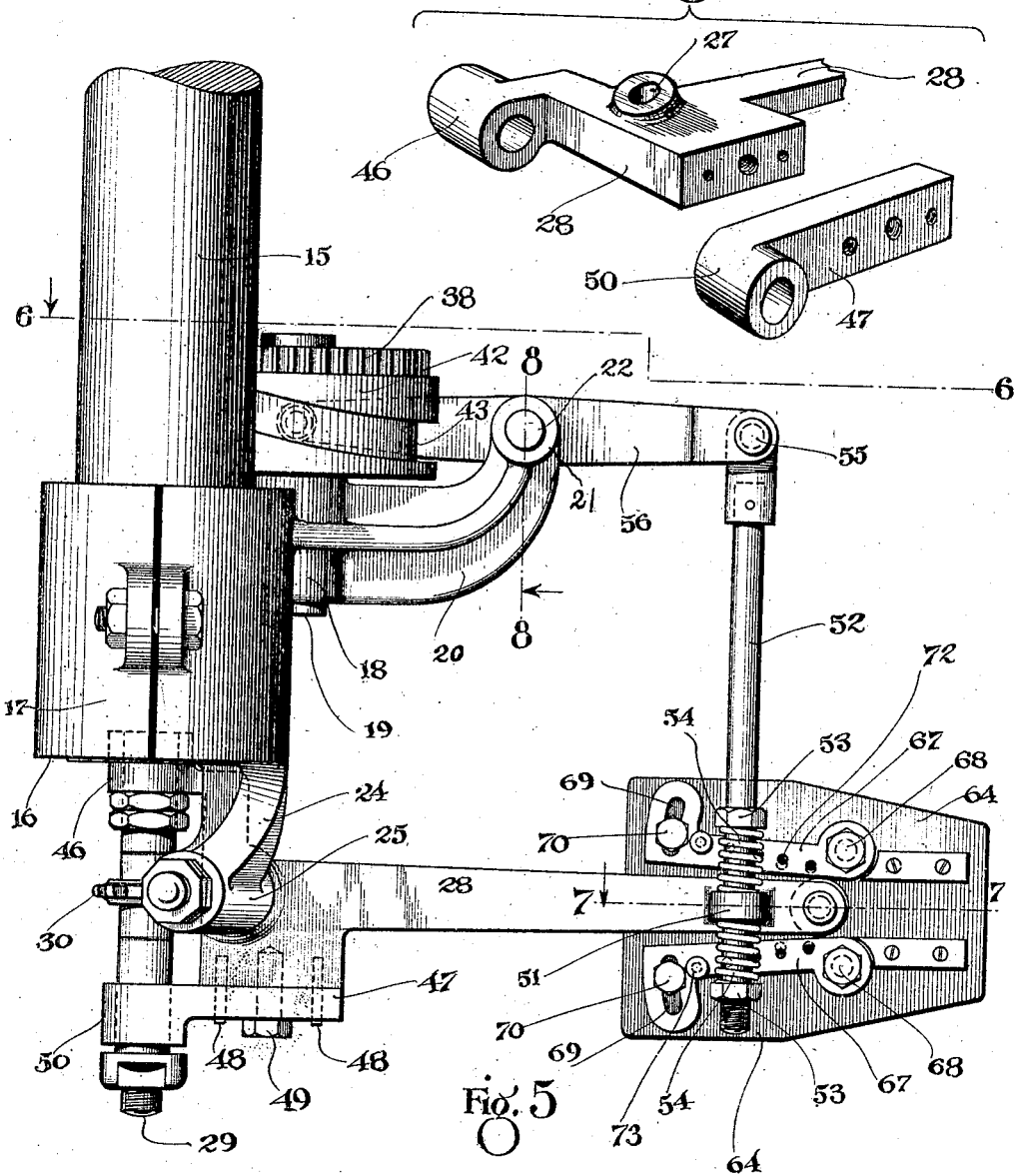

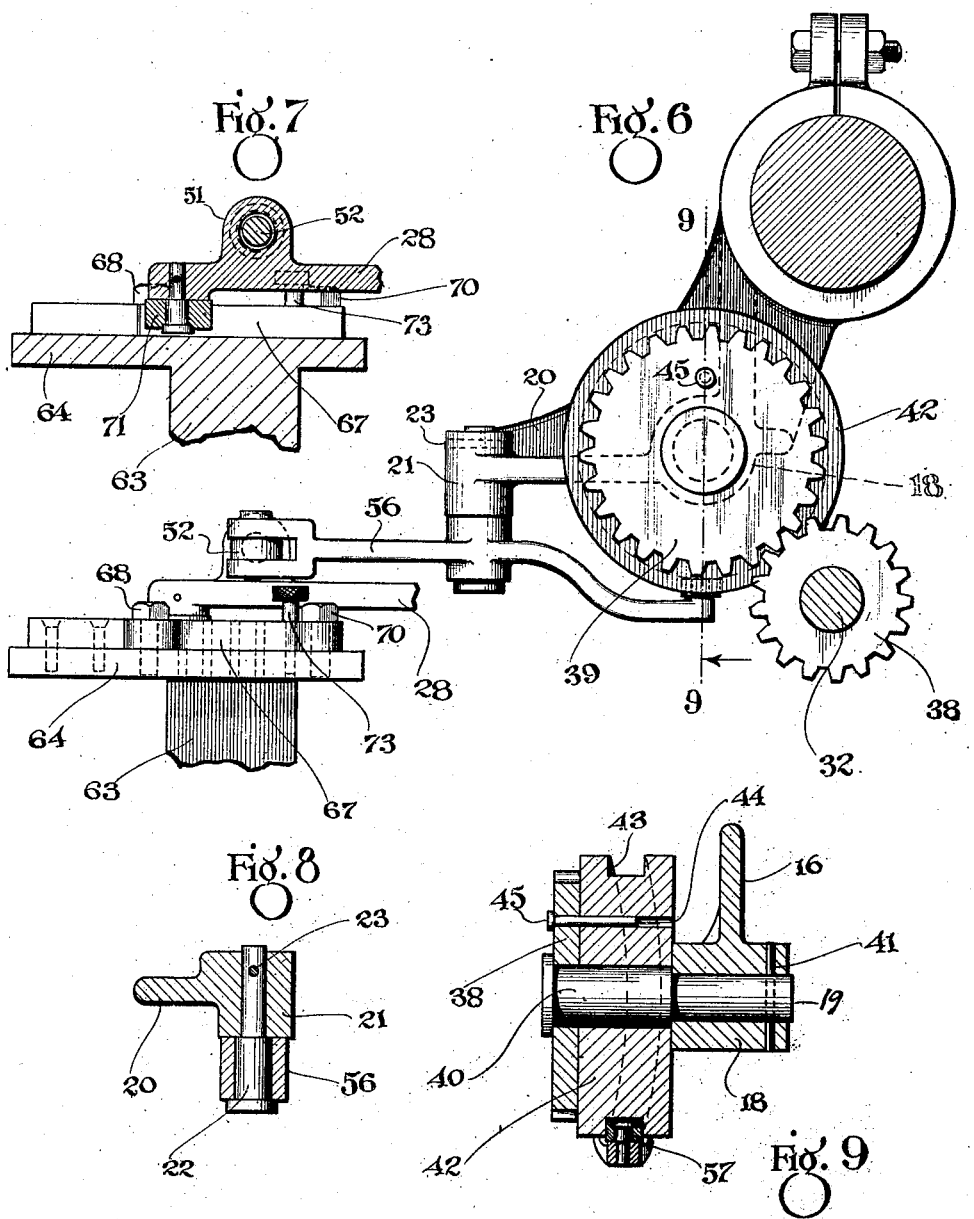

UNITED STATES PATENT OFFICE.

MATHIAS FOGDE, OF RICHMOND, VIRGINIA.

GEAR-CUTTING ATTACHMENT FOR MILLING-MACHINES.

1,377,330.  Specification of Letters Patent.  Patented May 10, 1921.

Application filed January 9, 1920. Serial No. 350,333.

*To all whom it may concern:*

Be it known that I, MATHIAS FOGDE, a citizen of Finland, and a resident of Richmond, in the county of Henrico and State of Virginia, have invented certain new and useful Improvements in Gear-Cutting Attachments for Milling-Machines, of which the following is a specification.

My present invention relates generally to gear cutting devices, and more particularly to attachments for milling machines for cutting bevel gears, my primary object being the provision of a device which will automatically cut and contour the teeth of bevel gears in such manner as is now impossible on machines of this character.

It is well known that the teeth of bevel gears are of gradually changing contour from end to end, and that more or less guess work is required, generally throughout several operations, in forming such gear teeth on the usual milling machine. My attachment is capable of ready application to such machines for the purpose of performing practically and automatically, and in a single operation, what now requires more than a single cut and more or less guess work with doubtful results.

With this above general statement in mind my invention in its more specific aspect, resides in the features of construction, arrangement and operation to be now described with respect to the accompanying drawings, which form a part of this specification, and in which, Figure 1 is a front elevation of a milling machine with my improved attachment, Fig. 2 is a detail horizontal section through the guide support, Fig. 3 is a side view, partly in section of the upper portion of the milling machine, Fig. 4 is a detail perspective view of one end of the cutter shifting lever, showing its parts in detached relation, Fig. 5 is a top plan view of a portion of the milling machine with my attachment, Fig. 6 is a vertical sectional view taken on line 6—6 of Fig. 5, Fig. 7 is a detail vertical section through a portion of the guide, taken substantially on line 7—7 of Fig. 5, Fig. 8 is a detail section taken on line 8—8 of Fig. 5, and Fig. 9 is a vertical section on line 9—9 of Fig. 6.

Referring now to these figures and particularly to Figs. 1 and 3 my invention is applied to that type of milling machine generally indicated at 10 in Fig. 1 and having a movable table 11 and an upper frame 12, the latter of which supports the main shaft 13 having at its forward end a spindle receiving socket member 14. The upper frame 12 also supports an overhanging arm 15 which projects forwardly parallel with and above the main shaft 13 and in vertical alinement therewith. In the usual construction this overhanging arm 15 supports a bracket which carries an outer spindle bearing axially alined with the spindle socket member 14 so that these parts may respectively receive the outer and inner ends of the usual cutter spindle.

In accordance with my improvements however an attachment is provided which consists of a bracket 16 having a tubular portion 17 to be clamped around the forward end of the overhanging arm 15 in place of the usual spindle bearing bracket, and this bracket has an inner shaft bearing 18 which receives a shaft 19 adjacent to and parallel with the main shaft 13 of the milling machine.

The bracket 16 of my improved attachment also has a rearward extension 20 at its inner portion terminating in a vertically disposed bearing 21 in which the upper end of a fulcrum stud 22 is secured as by means of a transverse pin 23, as particularly shown in Fig. 8.

The bracket 16 has at its outer or forward portion a twisted extension 24 terminating in an upright bearing 25, inclined with respect to a vertical line for the reception of a fulcrum pin 26 whose lower end is secured in the inclined bearing 27 adjacent to one end of a cutter shifting lever 28.

In the present device the cutter shaft is formed of an outer cylindrical section 29 on which the cutter 30 may be positioned between sleeves 31, and an inner portion 32 having a tapered extension 33 to enter socket member 14 of the main shaft.

The cutter shaft also comprises a central section in the nature of a slip joint, the parts 34 and 35 of which are universally connected at 36 and 37 to the inner and outer sections of the cutter shaft, part 34 being in the nature of a stem, and part 35 being in the nature of a socket member having a splined connection with the stem.

The inner part 32 of the cutter shaft has a small gear 38 in mesh, as seen particularly in Fig. 6, with a larger gear 39, the latter of which is mounted to rotate upon an extension 40 of the stationary shaft 19 secured at one end, as by means of a pin 41, within the bracket bearing 18. The gear 39 is detachably connected with a cam wheel 42 also mounted to rotate on the shaft extension 40, said cam wheel having a peripheral cam groove 43, and a transverse opening 44, the latter of which is adapted to receive a pin 45 extending through the gear wheel 38 as best seen in the detail Fig. 9.

The lever 28 before mentioned is laterally enlarged at one end adjacent to the cutter shaft and is provided with a laterally offset endwise projecting transverse bearing 46 to receive the inner portion of the outer section 29 of the cutter shaft, and this lever also has a detachable side section 47, and removably held in connection therewith are pins 48 and a bolt 49 provided with a transverse bearing 50 which alines with the bearing 46 so as to receive the outer portion of the outer section 29 of the shaft, thus adapting swinging movement of the lever 28 upon its fulcrum pin 26 to be communicated to the outer section of the cutter shaft, it being obvious that such movements of the cutter shaft are permitted by virtue of the universal connections and the slip joint between its parts.

For communicating movement to the lever 28, its outer end has an upright transverse bearing 51 loosely through which the forward end of a connecting rod 52 projects. This connecting rod has annular shoulders spaced forwardly and rearwardly of the lever bearing, formed for instance by nuts 53, and between which nuts or shoulders and the sides of the bearing 51 are springs 54 coiled around the forward end of the connecting rod 52.

The rear end of the connecting rod 52 is pivotally connected at 55 to the outer end of a lever 56, the latter of which as particularly seen in Fig. 6 has a bearing intermediate its ends rotatably disposed upon the fulcrum pin 22 before mentioned and as clearly seen in Fig. 8. The inner end of this lever 56 supports a roller 57 disposed in the cam groove of the cam 42.

It is thus obvious that with the attachment in place as described rotation of the milling shaft 13 will be communicated through the spindle 33 to the cutter shaft and, when the cutter shaft is thus rotated rotation will also be communicated through the gears 38 and 39 to the cam wheel 42. Rotation of this cam wheel imparts swinging motion to the lever 56 and, in turn, through the connecting rod 52, to the cutter shifting lever 28.

In its normal position as seen in Figs. 1 and 5, the cutter actuating lever is in horizontal position so that were its fulcrum pin perpendicular to its longitudinal axis, swinging movement of the lever would simply swing the cutter 30 in a horizontal plane. By virtue however of the fact that the fulcrum pin 26 of lever 28 stands at an angle with respect to the perpendicular, it is obvious that when the lever is shifted, the cutter 30 will both shift laterally and rise to a slight angle which increases gradually as the outer end of the lever is shifted beyond either side of its normal central position shown in Fig. 5.

In order to provide effective positive limit for the shifting movement of the lever 28, the moving table 11 of the milling machine 10, which supports the dividing head 58 carrying the work support 59, is also provided with a slotted upright 60, secured to the table by bolts 61 through its lugs 62. This slotted upright 60 receives a depending shank 63 of a horizontal guide plate 64, carrying a clamping bolt 65 by means of which it is adjustably connected to the slotted upright. The guide plate 64 is positioned approximately in a horizontal plane of the work, or in other words the gear 66 carried by the work support 59 as seen in Fig. 1, and the outer surface of the guide plate, as best seen in Fig. 5, has a pair of laterally spaced arms 67, whose outer ends are pivotally connected at 68 to the guide plate, and whose inner ends have segmental slotted extensions 69 receiving guide bolts 70 upstanding from the guide plate. The guide arms 67 are disposed upon opposite sides of a guide roller 71 carried by the extreme outer end of the cutter shifting lever 28 and disposed below the same, and each of these guide arms has a lengthwise series of openings 72, each opening being adapted to aline with a similar opening in the guide plate 64 when the arms 67 are in various positions of adjustment to which they are movable on their pivots 68. The openings of the arms and the guide plate 64, when alined, are adapted to receive locking pins 73, one of which is plainly shown in Fig. 6, and it is thus obvious that these guide arms 67, which diverge inwardly with respect to one another in any position of adjustment, form effective adjustable limits for the shifting movement of the lever 28 uneffected by the throw of the cam in view of the fact that when the limits set by the guide arms in adjusted position are reached, the connecting rod 52 shifted by the lever 56, is movable relatively to the lever 28 under tension of the spring 54.

It is obvious from the foregoing that the attachment as a whole may be readily connected to and disconnected from a milling machine of the type shown and described by simply connecting or disconnecting its bracket 16 in respect to the overhanging arm 15 and at the same time either inserting or removing the spindle 33 from the socket of the main milling machine shaft 13.

It is also obvious that by withdrawing the pin 45, seen in Figs. 6 and 9, and with the lever 28 in normal position shown in Fig. 5, the automatic shifting movements of the cutter for the purpose of cutting bevel gears may be dispensed with as the cam actuating connections will thus be interrupted.

It is also obvious that my invention provides means whereby a cam of greater throw than that necessary, may still be utilized in view of the positive means of limiting shifting movement of the cutter shifting lever, and the yielding connections between this cutter shifting lever and the cam engaging lever. Thus I avoid the necessity of a strictly accurate cam and provide some play for flexibility and allowance for wear.

In operation with my improved attachment connected to the milling machine as described, rotation of the milling shaft is communicated through the flexible spindle to the cutter shaft and during rotation of the cutter shaft rotative movement is also communicated to the cam wheel 42 through the gears 38 and 39. Rotation of this cam wheel causes swinging movement of the lever 56 and this movement is communicated through the connecting rod 52 to the cutter shifting lever 28 and, due to the peculiarities before described in the mounting of this lever, its shifting movement causes both lateral and angular vertical movement of the cutter 30 so as to follow a desired line of movement along the proposed contour of a gear tooth being cut, under control of the means described to guide and limit shifting movement of lever 28.

My invention thus provides a means for the present purposes which will be readily mountable and demountable, which will be simple and inexpensive both as to first cost and up keep, which will be entirely automatic in its operation in use, and which will insure of effective accurate results in but a single operation upon each side face of each bevel gear tooth.

I claim:

1. An attachment of the character described for milling machines having a main shaft provided with a socket, and having an over hanging arm, consisting of a bracket attachable to the over hanging arm, a cutter shaft including inner and outer sections having a universally movable slip joint connection therebetween, the outer section of which is adapted to support a milling cutter and the inner section of which has a spindle for engagement with the socket of the milling machine shaft, a lever movably mounted in connection with the bracket and having bearings for the outer section of the cutter shaft, a cam rotatably supported by the bracket and having a geared connection with the inner section of the cutter shaft, horizontally shiftable connections actuated by the cam and engaged with the said lever, and means for swinging the lever vertically during its horizontal shifting movements.

2. An attachment of the character described for milling machines having a main shaft provided with a socket, and having an over hanging arm, consisting of a bracket attachable to the over hanging arm, a cutter shaft including inner and outer sections having a universally movable slip joint connection therebetween, the outer section of which is adapted to support a milling cutter and the inner section of which has a spindle for engagement with the socket of the milling machine shaft, a lever movably mounted in connection with the bracket and having bearings for the outer section of the cutter shaft, a cam rotatably supported by the bracket and having a geared connection with the inner section of the cutter shaft, horizontally shiftable connections actuated by the cam and engaged with the said lever, said lever having an upright fulcrum in connection with the bracket inclined with respect to the perpendicular to the lever as described.

3. An attachment of the character described for milling machines having a main shaft provided with a socket, and having an over hanging arm, consisting of a bracket attachable to the overhanging arm, a cutter shaft including inner and outer sections having a universally movable slip joint connection therebetween, the outer section of which is adapted to support a milling cutter and the inner section of which has a spindle for engagement with the socket of the milling machine shaft, a lever movably mounted in connection with the bracket and having bearings for the outer section of the cutter shaft, a cam rotatably supported by the bracket and having a geared connection with the inner section of the cutter shaft, horizontally shiftable connections actuated by the cam and engaged with the said lever, guide means movably mounted with respect to the said lever and forming the limits of its shifting movement, and a flexible connection between the lever and the horizontally shiftable actuating connections as described.

4. An attachment of the character described including a support, a horizontally shiftable lever having a fulcrum in connection with the support inclined with respect to a perpendicular to the lever, a cutter shaft having bearing in one end of said lever and having a spindle universally movable and endwise shiftable with respect thereto, and horizontally shiftable actuating connections engaged with the other end of said lever as described.

5. An attachment of the character described including a support, a horizontally shiftable lever having a fulcrum in connection with the support inclined with respect to a perpendicular to the lever, a cutter shaft having bearing in one end of said lever and having a spindle universally movable and endwise shiftable with respect thereto, and cam actuated connections engaged with the other end of said lever for shifting the same.

6. A gear cutting attachment of the character described comprising a supporting bracket, a horizontally shiftable lever having a fulcrum in connection with said bracket inclined with respect to the perpendicular to said lever, a cutter shaft including a cutter holding section having bearing in one end of said lever, and a spindle having a universally movable and endwise shiftable connection with said cutter holding section, actuating connections leading to the other end of said lever for shifting the same, and guide means forming the limits of shifting movement of the lever, said actuating connections having a yielding connection with the lever as and for the purpose described.

7. A gear cutting attachment of the character described comprising a supporting bracket, a horizontally shiftable lever having a fulcrum in connection with said bracket inclined with respect to the perpendicular to said lever, a cutter shaft including a cutter holding section having bearing in one end of said lever, and a spindle having a universally movable and endwise shiftable connection with said cutter holding section, actuating connections having yielding connection with the opposite end of said lever, and adjustable guide members bodily movable with respect to and upon opposite sides of the last named end of the lever and forming rigid limits of shifting movement of the lever as described.

8. A device of the character described including a support, a shiftable cutter shaft, a shifting member for the cutter shaft, means actuated by the cutter shaft for shifting said member, and means forming a fulcrum for said member, inclined with respect to a right angle to the plane of shifting movement of the member as described.

9. A device of the character described including a rotatable cutter shaft having a milling cutter, a support therefor shiftable to swing the shaft endwise, and a frame in which the said support is fulcrumed to simultaneously swing in vertical and horizontal directions.

10. A device of the character described including a rotatable cutter shaft having a milling cutter, a horizontally shiftable member in which the cutter shaft has bearing, means for shifting said member, and means whereby to swing the member vertically during its horizontal shifting movement.

11. A device of the character described, including a rotatable cutter shaft having a milling cutter, a member in which the cutter shaft is rotatable, having a fulcrum upon which the same is horizontally shiftable, said fulcrum being inclined with respect to the perpendicular to said member to cause the latter to swing vertically during its shifting movements, and means for shifting the said member as described.

12. A device of the character described comprising a rotatable cutter shaft having an endwise swingable cutter supporting section, a lever in which the said cutter supporting section of the cutter shaft has bearing, arranged to simultaneously shift in a horizontal direction and swing vertically, means having flexible connection with the said lever for shifting the same, and adjustable guide means forming limits of movement of said lever as described.

MATHIAS FOGDE.